(12) United States Patent
Winston

(10) Patent No.: US 11,551,427 B2
(45) Date of Patent: *Jan. 10, 2023

(54) SYSTEM AND METHOD FOR RENDERING VIRTUAL REALITY INTERACTIONS

(71) Applicant: Ronald H. Winston, Grapeview, WA (US)

(72) Inventor: Ronald H. Winston, Grapeview, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/473,349

(22) Filed: Sep. 13, 2021

(65) Prior Publication Data
US 2022/0076493 A1 Mar. 10, 2022

Related U.S. Application Data

(63) Continuation of application No. 16/107,736, filed on Aug. 21, 2018, now Pat. No. 11,145,124.
(Continued)

(51) Int. Cl.
G06T 19/00 (2011.01)
G06F 3/01 (2006.01)
G06T 7/20 (2017.01)
G06T 3/40 (2006.01)
G06T 11/60 (2006.01)
G02B 27/01 (2006.01)

(52) U.S. Cl.
CPC ............ *G06T 19/006* (2013.01); *G06F 3/013* (2013.01); *G06T 3/4038* (2013.01); *G06T 7/20* (2013.01); *G06T 11/60* (2013.01); *G02B 27/017* (2013.01); *G02B 2027/0138* (2013.01)

(58) Field of Classification Search
None
See application file for complete search history.

(56) References Cited

U.S. PATENT DOCUMENTS 10,269,177 B2 * 4/2019 Frueh ..................... G06V 40/19
10,445,863 B2 10/2019 Grossinger et al.
(Continued)

FOREIGN PATENT DOCUMENTS

CN 107305621 A 10/2017
CN 107491165 A 12/2017
(Continued)

OTHER PUBLICATIONS

First Office Action for Chinese Patent Application No. CN201980018658, dated Feb. 8, 2022.
(Continued)

*Primary Examiner* — Frank S Chen
(74) *Attorney, Agent, or Firm* — Locke Lord LLP; Christopher J. Capelli

(57) ABSTRACT

A Virtual Reality (VR) computer system and method including a VR headset to be worn by at least one user; one or more pupil sensors located in the VR headset configured and operative to capture and track pupil movement of the at least one user wearing the VR headset; and at least one camera device operative to capture video image of at least one user wearing the VR headset. A computer processor is instructed to generate a two-dimensional (2D) image of the least one user such that an image of the VR headset is virtually removed from the image of the at least one user wearing the VR headset.

12 Claims, 7 Drawing Sheets

Related U.S. Application Data

(60) Provisional application No. 62/551,960, filed on Aug. 30, 2017.

(56) References Cited

U.S. PATENT DOCUMENTS

| | | |
|---|---|---|
| 10,593,025 B2 | 3/2020 | Grossinger et al. |
| 10,838,206 B2 | 11/2020 | Fortin-Deschênes et al. |
| 11,238,568 B2 | 2/2022 | Grossinger et al. |
| 2012/0327196 A1 | 12/2012 | Ohba et al. |
| 2015/0326570 A1 | 11/2015 | Publicover et al. |
| 2016/0217621 A1 | 7/2016 | Raghoebardajal et al. |
| 2016/0341959 A1 | 11/2016 | Gibbs et al. |
| 2017/0178306 A1 | 6/2017 | Le Clerc et al. |
| 2017/0243334 A1 | 8/2017 | Grossinger et al. |
| 2017/0293356 A1 | 10/2017 | Khaderi et al. |
| 2018/0061133 A1 | 3/2018 | Wu |
| 2018/0157045 A1 | 6/2018 | Davami |
| 2019/0011612 A1 | 1/2019 | Mastrangelo et al. |
| 2019/0179423 A1 | 6/2019 | Rose et al. |

FOREIGN PATENT DOCUMENTS

| | | |
|---|---|---|
| CN | 107680069 A | 2/2018 |
| JP | H1196366 A | 4/1999 |
| WO | WO-2015185537 A1 | 12/2015 |

OTHER PUBLICATIONS

Office Action for Japanese Patent Application No. JP2020546898, dated Aug. 9, 2022.

Office Action for Canadian Patent Application No. CA3089885, dated Feb. 11, 2022.

\* cited by examiner

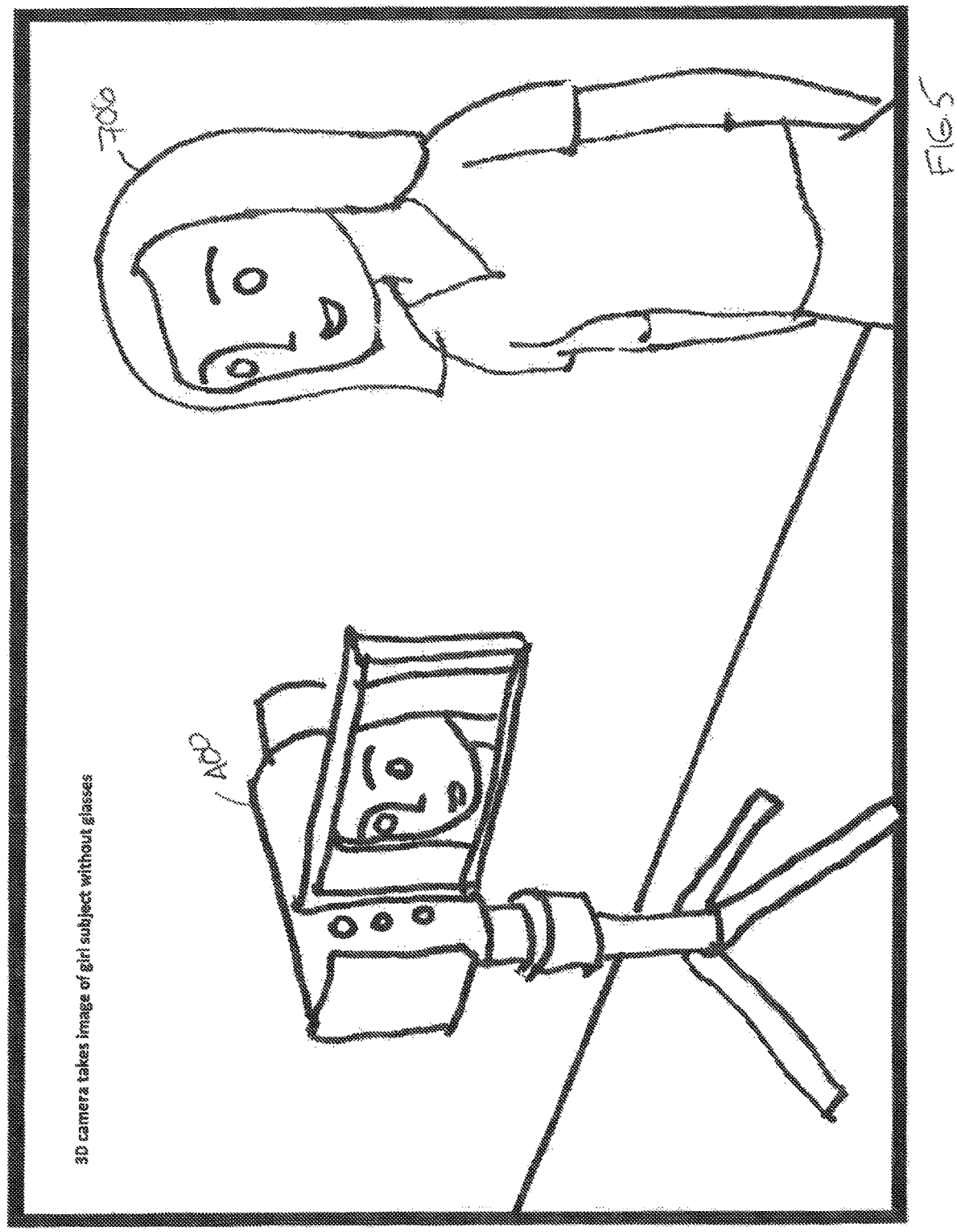

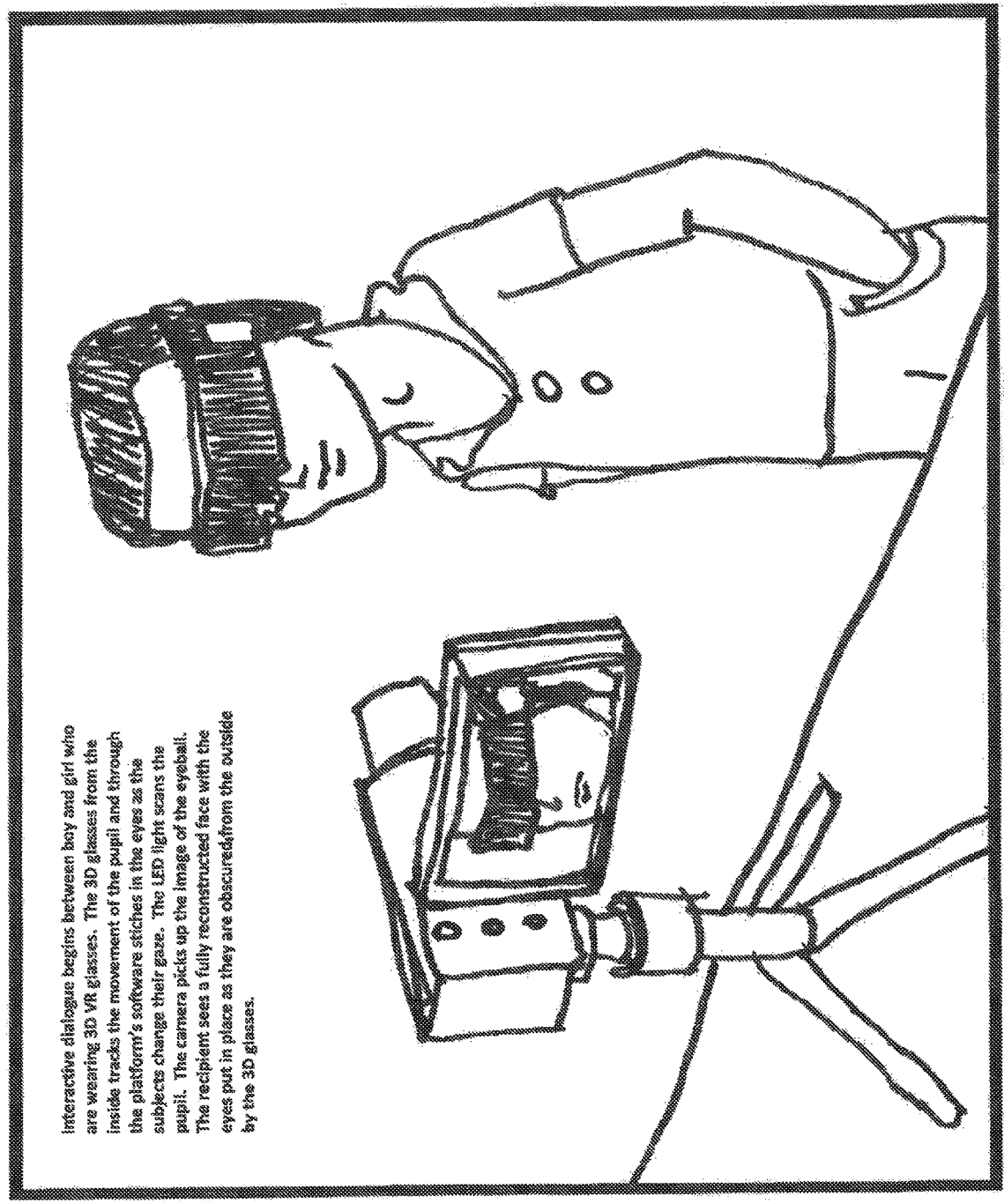

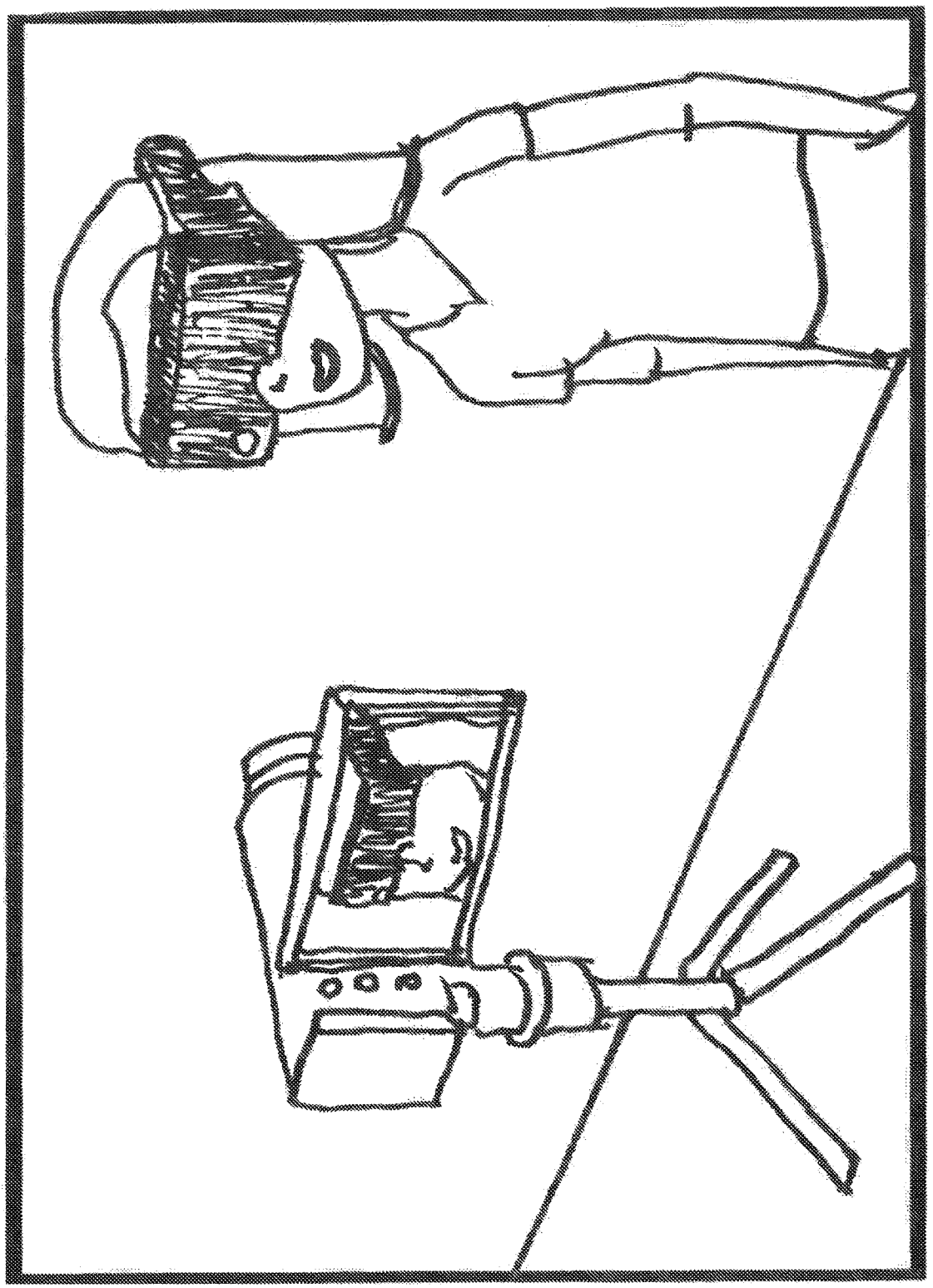

SYSTEM AND METHOD FOR RENDERING VIRTUAL REALITY INTERACTIONS

CROSS REFERENCE TO RELATED APPLICATIONS

This application is a Continuation of U.S. patent application Ser. No. 16/107,736 filed Aug. 21, 2018, which claims priority to U.S. Patent Application No. 62/551,960 filed Aug. 30, 2017, which are incorporated herein by reference in its entirety.

FIELD OF THE INVENTION

This description generally relates to methods and devices for capturing and processing two-dimensional (2D) and three-dimensional (3D) images, and more particularly to virtually removing user headsets during a VR interaction between two or more users

BACKGROUND OF THE INVENTION

Virtual Reality (VR) enables remarkably immersive experiences, offering new ways to view the world and the ability to explore novel environments, both real and imaginary. However, compared to physical reality, sharing these experiences with others can be difficult, as VR headsets make it challenging to create a complete picture of the people participating in the experience.

Some of this disconnect is alleviated by Mixed Reality (MR), a related medium that shares the virtual context of a VR user in a two dimensional video format allowing other viewers to get a feel for the user's virtual experience. Even though MR facilitates sharing, the headset continues to block facial expressions and eye gaze, presenting a significant hurdle to a fully engaging experience and complete view of the person in VR.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

The general purpose of this project is to provide a live VR chat experience. Currently VR chat applications make use of animated avatars. An object of the present invention is to replace the avatars with live video without the image of a user's headsets which would be replaced visually by a 3D model of the users' head (e.g., recorded previously without the headset being worn by a user). Another object of the present invention is each user may adjust their level of realism (e.g., from avatar to live 3D video image).

BRIEF DESCRIPTION OF THE DRAWINGS

The accompanying appendices and/or drawings illustrate various non-limiting, example, inventive aspects in accordance with the present disclosure:

FIGS. 4-7 illustrate portions of the process for creating a VR chat between users in accordance with the described illustrated embodiments.

DETAILED DESCRIPTION OF CERTAIN EMBODIMENTS

Figure 1:
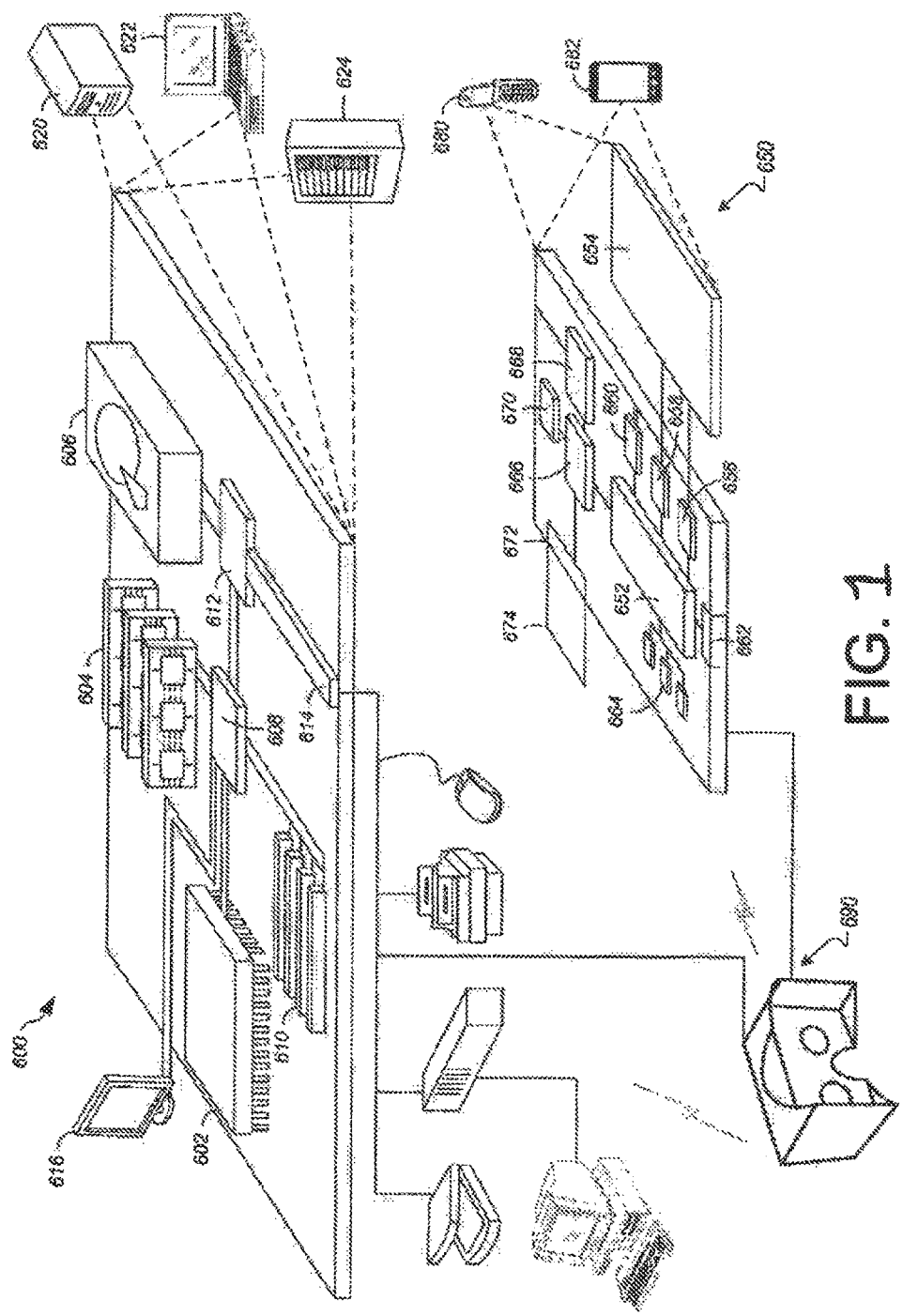
FIG. 1 illustrates an example of a computer device and a mobile device that can be used is implement the techniques described herein.

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Where a range of values is provided, it is understood that each intervening value, to the tenth of the unit of the lower limit unless the context clearly dictates otherwise, between the upper and lower limit of that range and any other stated or intervening value in that stated range is encompassed within the illustrated embodiments. The upper and lower limits of these smaller ranges may independently be included in the smaller ranges is also encompassed within the illustrated embodiments, subject to any specifically excluded limit in the stated range. Where the stated range includes one or both of the limits, ranges excluding either both of those included limits are also included in the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

The publications discussed herein are provided solely for their disclosure prior to the filing date of the present application. Nothing herein is to be construed as an admission that the illustrated embodiments are not entitled to antedate such publication by virtue of prior invention. Further, the dates of publication provided may differ from the actual publication dates which may need to be independently confirmed.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims. All publications and references cited herein are expressly incorporated herein by reference in their entirety.

Turning now descriptively to the drawings, in which similar reference characters denote similar elements throughout the several views, FIG. 1 depicts an exemplary general-purpose computing system 600 and a generic mobile computer device 650, which may be used with the techniques described here. It is to be appreciated computing system 600 and mobile device 650 are to be understood as an exemplary embodiments in which one or more components thereof may be used with the illustrated embodiments of the present invention as described herein.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. In addition, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, Wi-Fi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smart phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) (and other suitable display technology) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

The computing devices depicted in FIG. 1 interface with a virtual reality (VR headset 690). In an illustrated embodiment, one or more sensors are included in the VR headset to virtual remove the appearance of the headset 690 when one user interacts with another user. For instance, the headset sensors 690 may include one or more LED's 691 that illuminates an eye of a user while tracking the user's pupil and one or more micro cameras 693 for recording the user's eye/pupil.

For instance, an embodiment of the present invention creates a model of the user's face 704 without a headset 690 using a camera device 400 as a proxy for the user's hidden face when a headset 690 is worn. This proxy is used to synthesize the face in a Mixed Reality (MR) video, thereby creating an impression of the headset 690 being removed when one using interacts with another user in a VR realm. For instance, this initial calibration step may require the user 704 to sit in front of a color+depth camera 400 and a monitor, and then track a marker on the monitor with their eyes. This calibration procedure acquires a 3D face model of the user 704, and create a database that maps appearance images (or textures) to different eye-gaze directions and blinks (via sensors 691 and 693). The aforementioned eye-gaze database (i.e. the face model preferably with textures indexed by eye-gaze) enables the appearance of a user's face to be dynamically changed to generate desired (and real-time) eye-gaze, thus making the synthesized face look natural and alive. It is to be appreciated the construct of the face can also be altered by using suitable wire frame software technology.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR space to control objects in the VR space.

Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

With the exemplary computing system environment 100 of FIG. 1 being generally shown and discussed above, and with reference now to FIGS. 2-7, described below is implementation of various exemplary embodiments.

Figure 2:
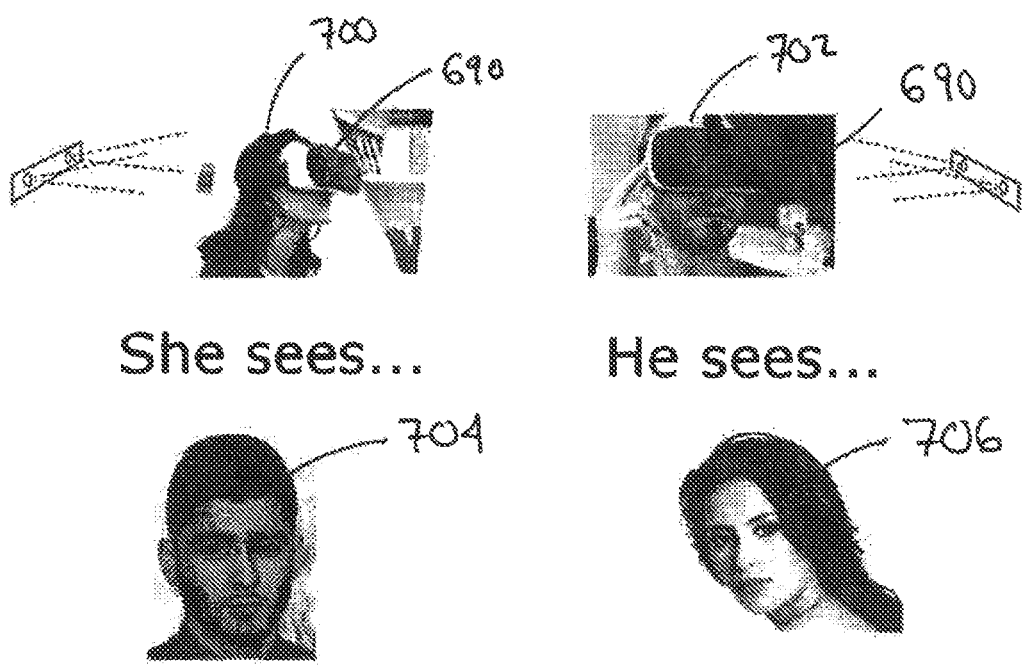
FIG. 2 depicts users wearing headsets and the view a headset wearing user perceives of another headset wearing user.
Figure 3:
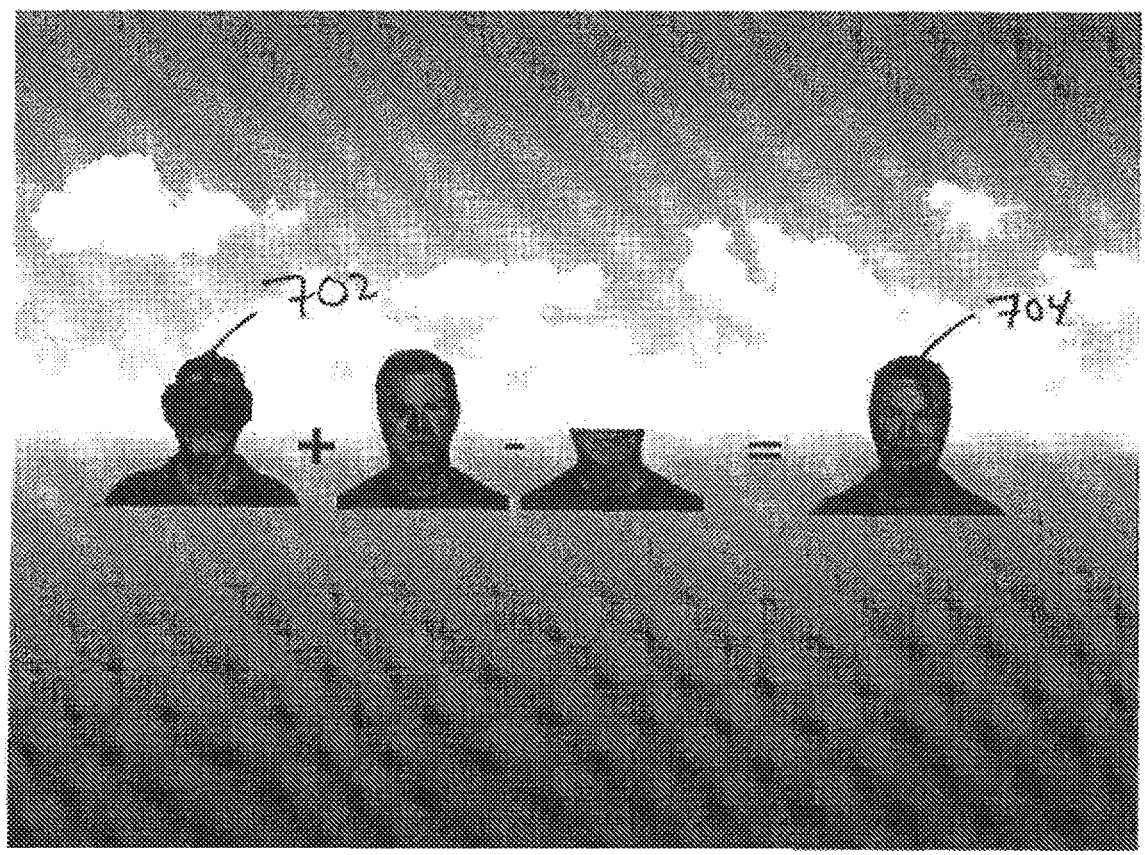
FIG. 3 depicts the process for removing the image of a headset from a user to create a VR of the user as if the headset was removed.

It is to be appreciated an environment of use for an illustrated embodiment of the present invention relates to a system 600 that enables online chat in VR preferably with live video. In the example discussed below used to described an illustrated embodiment, it is to be understood it assumes a two person live chat with a local user and a remote user (which the present invention is not to be understood to be limited to). Exemplary embodiments include one or more components of the above described system 600 including a VR system such as Oculus Rift™ one or more webcams 400 per user and preferably a green screen. With reference to FIG. 2, during a VR chat session in accordance with an illustrated embodiment, a remote user 700 wearing headset 690 for example would view a live video of another user 702 (wearing headset 690), minus the headset 690 that the local user is wearing 704, in VR. Likewise, during the same VR chat session, the remote user 702 wearing headset 690 would view a live video of the user 700 (wearing headset 690), minus the headset 690 that the local user is wearing 706, in VR.

Figure 4:
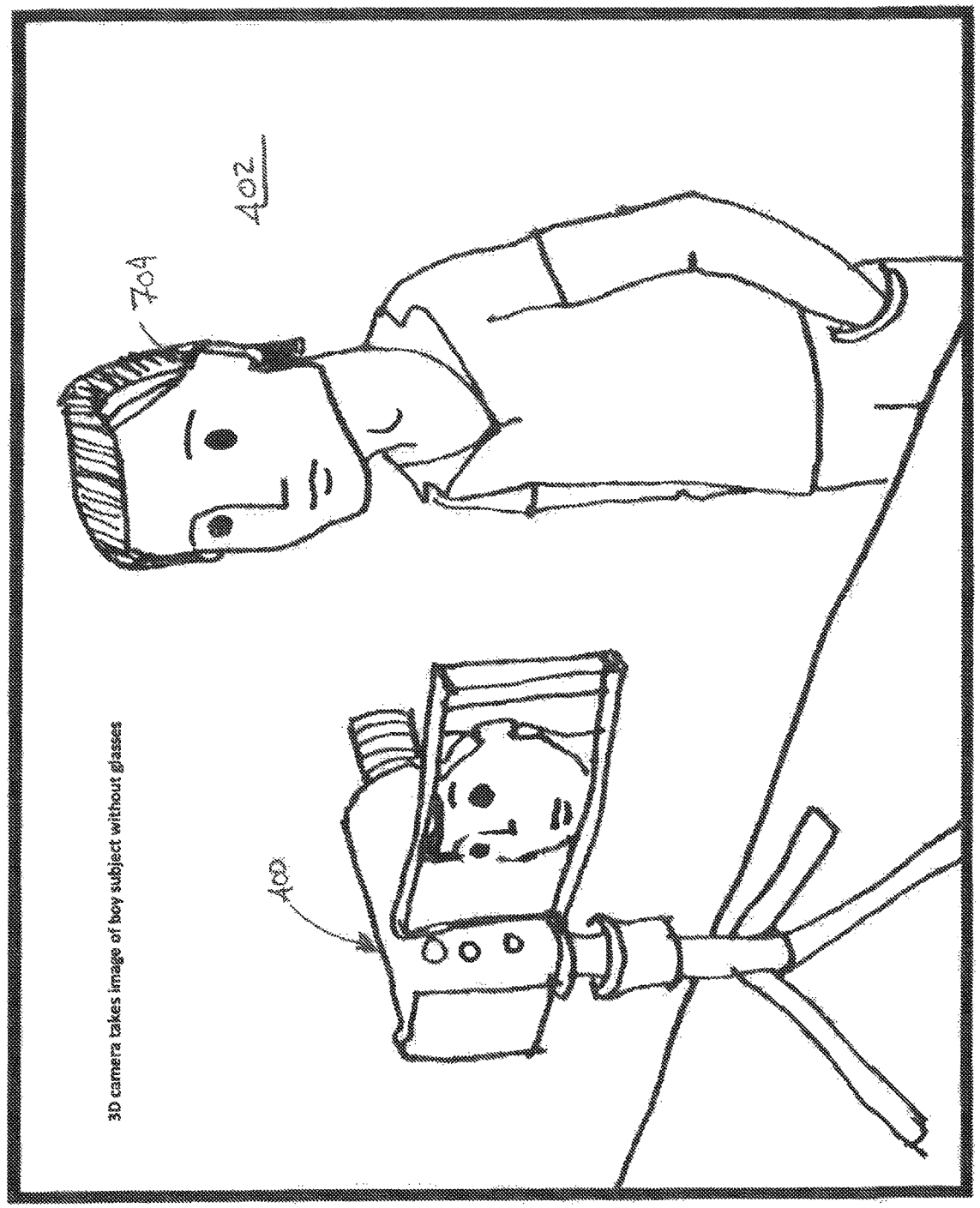

In accordance with an aspect of the present invention (and with reference to FIG. 3), the headset visual for a remote user is replaced by an overlay of pre-recorded static images/video of the local users' head. Preferably only a portion of the users head needs to be superimposed, as the mouth and lower portion of the face is still generally visible when wearing VR headsets. Preferably, the live video effect is created by chromakey ("green screen") technology preferably using a standard 2D webcam 400 (FIG. 4). Thus, in accordance with an illustrated embodiment, each user 704, 706 is preferably placed in front of a portable green screen (402). It is to be appreciated this may be negated by certain software techniques or alternatively it may be possible to determine the users outline without a green screen by using a 3D camera.

As described below, in accordance with an illustrated embodiment, two or more users (704 and 706) may participate in a live online chat using a special webcam 400 at each user location. Each user (704, 706) preferably wears a VR headset 690 (700, 702) whereby each user (704, 706) views a superimposed and prerecorded image of the other user's head (706, 704). The broadcast image is preferably a composite of a live video and prerecorded image. The live video preferably includes the body up to just above a user's mouth region (FIG. 3) (e.g., where the VR headset 690 generally resides). Thus, the recorded image is preferably the nose, eyes and top of head of a user (704, 706). It is to be appreciated that it should be possible to achieve a live chat with more than two persons, such as a corporate teleconference.

This recorded image may also be created prior using a special form of photogrammetry. This is the technique where multiple 2D images are stitched together and processed to create a 3D model and texture. Currently this process is expensive, time consuming, and requires special hardware and multiple cameras. In contrast, in accordance with an embodiment of the present invention, implementation of inexpensive stereoscopic cameras may be utilized consisting of two cameras facing the user, each with either stereoscopic or monoscopic vision. For instance, the user would rotate in their chair while the cameras record and capture the scene. Post processing of the stereoscopic or monoscopic camera output would be used to generate the 3D model.

With reference now to FIGS. 4-7, an exemplary process for enabling a VR session in accordance with an illustrated embodiment is described. First the face of each user 704 (FIG. 4), 706 (FIG. 5) without a headset is photographed by webcam 400. As shown in FIGS. 6 and 7, each user (704, 706) then wears a headset 690 having the aforementioned LED sensors 691 and 693 for detecting eye gaze, movement and blinking. Preferably the sensors 691 illuminates one eye of the user inside the headset 690 to track pupil movement while the micro video camera sensor 693 records a user's pupil. The processing chip 602 is preferably configured and operational to restore the moving pupil to the face by "stitching" it in preferably via software to complete the image of the face currently obscured by the headset 690. Thus, both users 704 and 706 can view 3D images of each other (via their respective headset 690) in real time as if the face of the other user 704, 706 were in front of them and unobscured by a headset 690.

It is to be further appreciated, that through the further use of electro-sensitive devices positioned preferably on the forehead and eyebrows of each user, the frowns expression of each user 704, 706 may also be tracked via software processing on the processing chip 602.

In summary, and in accordance with one or more illustrated embodiments, the present invention enables virtual projection of a webcam video stream of a user in a video chat, minus the users' headset. This is accomplished by modeling the users head in 3D using modelling techniques, such as photogrammetry. For instance, the top portion of a users' head is replaced by this model in real time, so the other participating user only views the body, head, face and eyes of a participating user, minus the headset 690.

It is to be appreciated multiple users (e.g., greater than two users) are to be encompassed wherein each user is modelled using one or more stationary stereoscopic 3D cameras (e.g., StereoLabs ZED camera, Microsoft Kinect, Intel RealSense line of 3D cameras, etc.). The 3D camera techniques additional may calculate a user's position, providing VR cooperative interaction. For instance, two users could play a game of catch on Mars or two people could take a virtual walk together in the Grand Canyon.

It is to be appreciated the present invention computing system 600 and headset 690 may be configured and operative for use in an Augmented Reality (AR) setting. AR is to be understood to be a technology that layers computer-generated enhancements atop an existing reality in order to make it more meaningful through the ability to interact with it. An illustrated embodiment includes AR being developed for use as an app preferably a the headset 690 to blend digital components into the real world in such a way that they enhance one another. For instance, two or more users, each in a different location, wearing the present invention headset 690 may use/operate the headsets 690 so as to appear next to one another in a chosen setting (e.g., skydiving) and/or location (e.g., Paris) whereby they not only in real-time visualize the same setting together (e.g., a street in Paris, France) but they view each other as if the headset 690 were removed, in accordance with the teachings herein.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The description provided herein should therefore be considered as merely illustrative of the principles, teachings and exemplary embodiments of this invention, and not in limitation thereof.

What is claimed is:

1. A Virtual Reality (VR) computer system, comprising:
    a VR headset to be worn by at least one user;
    one or more pupil LED sensors located internal of the VR headset configured and operative to capture and track pupil movement of the at least one user wearing the VR headset;
    at least one camera device positioned external of the VR headset operative to capture:
        1) video image of at least one user wearing the VR headset; and
        2) and one or more static images of the user not wearing the VR headset;
    one or more camera devices located internal of the VR headset configured and operative to capture and record real-time images of a user's pupils simulatanous with the capturing and tracking of the user's pupil movement by the one or more pupil LED sensors; and
    a computer processor having instructions to:
        receive from the one or camera devices the recorded real-time images of the user's pupils while wearing the VR headset;
        receive from the one or more pupil LED sensors the tracked pupil movement of the user's pupils caputured simulantanous with the recorded real-time images of the user's pupils while wearing the VR headset;
        generate a compilation of the one or more captured static images of the user without the VR headset and the captured real-time pupil images of the user captured by the one or more camera devices located internal of the VR headset; and
        stitch the compliation in a 2D image of the user whereby the compliation is superimposed proximate to the location the headset image was virtually removed from the user wearing the VR headset such that another user can view a VR image of the at least one user having the superimposed captured real-time pupil images and movement such that the at least one user was not wearing the VR headset.

2. The VR system as recited in claim 1, wherein the external camera device is a webcam.

3. The VR system as recited in claim 1, wherein the one or more sensors located in the VR headset include infrared LED sensors.

4. The VR system as recited in claim 1, wherein the 2D image of the user having the superimposed pupil image and movement is rendered in real-time.

5. A computer method for removing a headset image in Virtual Reality system, comprising:
    positioning one or more pupil LED sensors internal of the VR headset for capturing and tracking pupil movement of the at least one user wearing the VR headset;
    positioning at least one camera device external of the VR headset for capturing:
        1) video image of at least one user wearing the VR headset; and
        2) one or more static images of the user not wearing the VR headset;
    positioning one or more camera devices internal of the VR headset for capturing and recording real-time images of a user's pupils simulatanous with the capturing and tracking of the user's pupil movement by the one or more pupil LED sensors; and
    generating a two-dimensional (2D) image of the least one user, by utilizing the recorded real-time images of the user's pupils and the simulatanoulsy captured tracked pupil movements of the user's pupils while wearing the VR headset, such that an image of the VR headset is virtually removed from the image of the at least one user wearing the VR headset by stitching in a compilation of the one or more captured static images of the user without the VR headset and the captured real-time pupil images of the user captured by the one or more camera devices located internal of the VR headset such that the generated 2D image is superimposed proximate to the location the headset image was virtually removed from the user wearing the VR headset-such that another user can view a VR image of the at least one user having the superimposed captured real-time pupil images and movement such that the at least one user was not wearing the VR headset.

6. The computer method as recited in claim 5, wherein the external camera device is a webcam.

7. The computer method as recited in claim 5, wherein the one or more sensors located in the VR headset include infrared LED sensors.

8. The computer method as recited in claim 5, wherein the generated 2D image of the user having the superimposed pupil image and movement is rendered in real-time.

9. A computer method for removing a headset image in Virtual Reality system, comprising:
    positioning one or more pupil LED sensors internal of the VR headset for capturing and tracking pupil movement of the at least one user wearing the VR headset;

positioning at least one camera device external of the VR headset for capturing:
   1) video image of at least one user wearing the VR headset; and
   2) one or more static images of the user not wearing the VR headset;
positioning one or more camera devices internal of the VR headset for capturing and recording real-time images of a user's pupils simulatanous with the capturing and tracking of the user's pupil movement by the one or more pupil LED sensors; and
   generating a two-dimensional (2D) image of the least one user, by utilizing the recorded real-time images of the user's pupils and the simulatanoulsy captured tracked pupil movements of the user's pupils while wearing the VR headset, such that an image of the VR headset is virtually removed from the image of the at least one user wearing the VR headset by stitching in a compilation of the one or more captured static images of the user without the VR headset and the captured real-time pupil images of the user captured by the one or more camera devices located internal of the VR headset such that the generated 2D image is superimposed proximate to the location the headset image was virtually removed from the user wearing the VR headset-such that another user can view a VR image of the at least one user having the superimposed captured real-time pupil images and movement such that the at least one user was not wearing the VR headset.

10. The computer method as recited in claim 9, wherein the external camera device is a webcam.

11. The computer method as recited in claim 9, wherein the one or more sensors located in the VR headset include infrared LED sensors.

12. The computer method as recited in claim 9, wherein the generated 2D image of the user having the superimposed pupil image and movement is rendered in real-time.

\* \* \* \* \*